United States Patent [19]

Keddie

[11] Patent Number: 5,560,273
[45] Date of Patent: Oct. 1, 1996

[54] MITER BOX WITH VERTICAL AND HORIZONTAL ANGULAR POSITIONING DEVICES

[75] Inventor: David P. Keddie, Brookfield, Wis.

[73] Assignee: Hempe Manufacturing Co., Inc., New Berlin, Wis.

[21] Appl. No.: 257,722

[22] Filed: Jun. 9, 1994

[51] Int. Cl.⁶ ........................................ B27G 5/02
[52] U.S. Cl. ............... 83/767; 83/468.3; 83/522.18; 83/581; 33/630; 33/641; 269/83; 403/320
[58] Field of Search ............... 83/764–767, 522.15, 83/522.16, 522.17, 522.18, 522.19, 522.24, 471.3, 477.1, 581, 829; 269/229, 232, 235, 236, 83; 248/349; 33/496–500, 538, 630, 641; 403/320, 374, 409.1, DIG. 8

[56] References Cited

U.S. PATENT DOCUMENTS

| | | | |
|---|---|---|---|
| 147,764 | 2/1874 | Gause | 83/766 |
| 169,486 | 11/1875 | Sehorn | 269/232 |
| 434,134 | 8/1890 | McMillan | 83/767 |
| 446,431 | 2/1891 | Currier | 83/767 |
| 497,524 | 5/1893 | Loveall | 83/767 |
| 506,090 | 10/1893 | Beimling | 83/767 |
| 761,817 | 6/1904 | Burris | 83/766 |
| 976,296 | 11/1910 | Robbins | 83/766 X |
| 1,147,496 | 7/1915 | Foust | 83/766 |
| 2,606,580 | 8/1952 | Johnson | 83/522.18 X |
| 3,273,612 | 9/1966 | Keddie | 83/767 X |
| 3,397,722 | 8/1968 | Long | 83/762 |
| 4,206,910 | 6/1980 | Biesemeyer | 83/522.19 X |
| 4,320,678 | 3/1982 | Volk | 83/581 X |
| 4,346,636 | 8/1982 | Taylor | 83/767 |
| 4,608,898 | 9/1986 | Volk | 83/767 X |
| 4,622,123 | 11/1986 | Nejame, Jr. | 269/232 X |
| 4,875,399 | 10/1989 | Scott et al. | 83/581 X |

FOREIGN PATENT DOCUMENTS 547016  6/1993  European Pat. Off. .

*Primary Examiner*—Rinaldi I. Rada
*Assistant Examiner*—Clark F. Dexter
*Attorney, Agent, or Firm*—Andrus, Sceales, Starke & Sawall

[57] ABSTRACT

A miter box is provided with a simple demountable and adjustable board stop which operates in conjunction with the horizontal upper edge of the miter box backstop to position a board, such as a piece of cove molding, in an acute vertical angular position with respect to the miter box table which allows the board to be cut at the compound angle required for a mitered butt joint in which the cut pieces are mounted at the same relative angle in which they are positioned in the miter box. The box also includes a simple frictional locking mechanism to set the pivotable saw carriage in any selected horizontal angular position over the full range provided by the miter box.

1 Claim, 3 Drawing Sheets

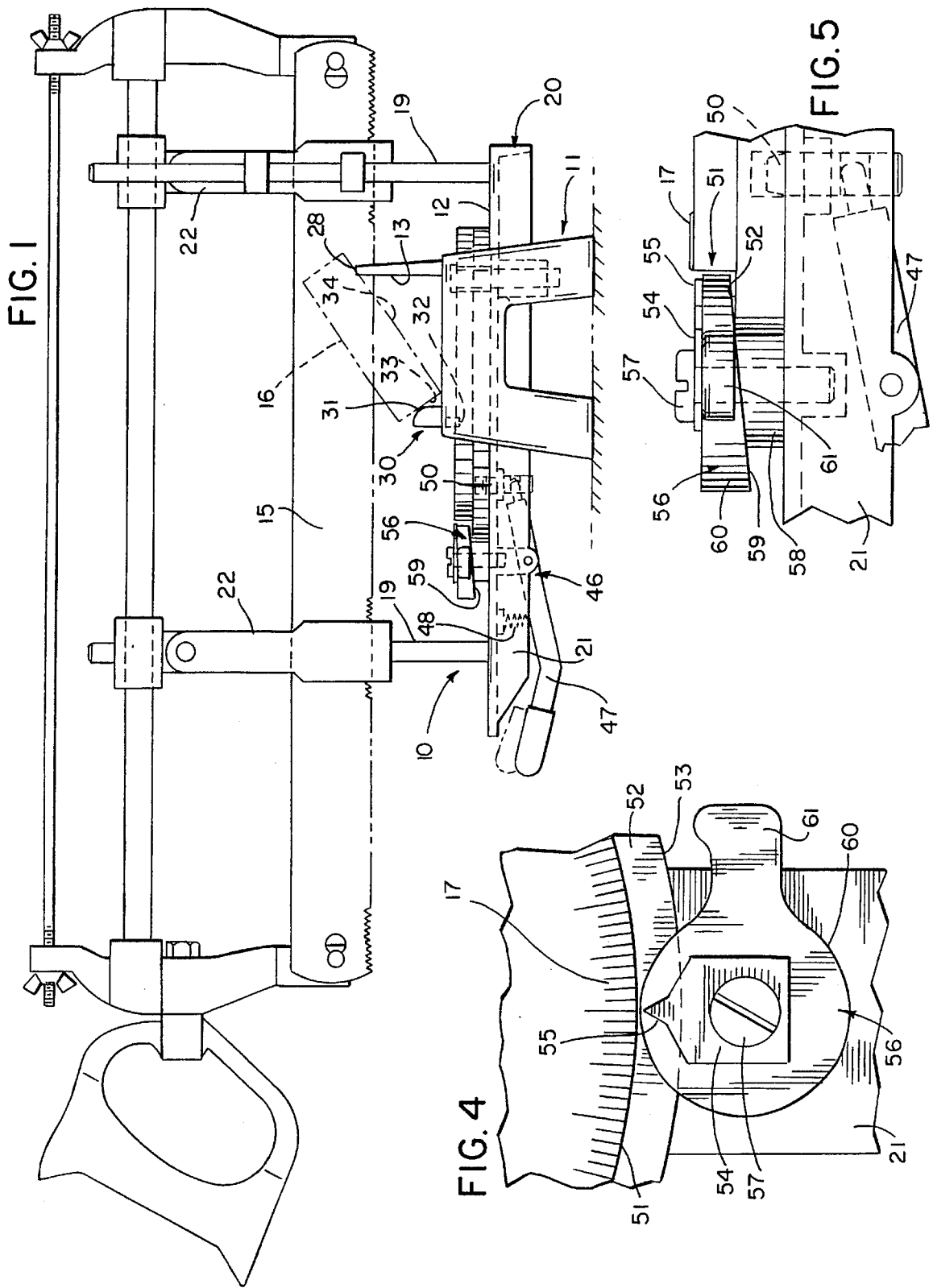

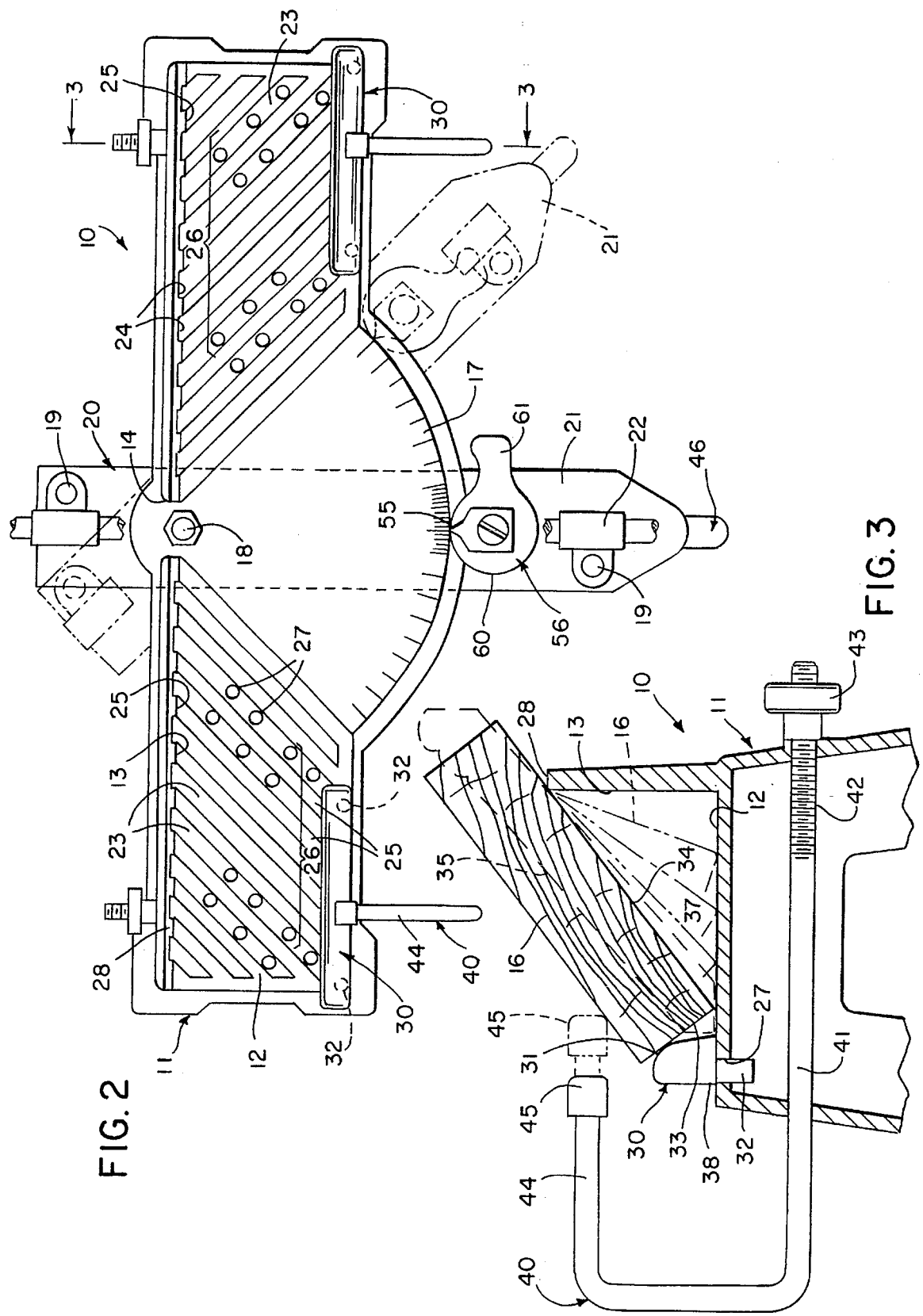

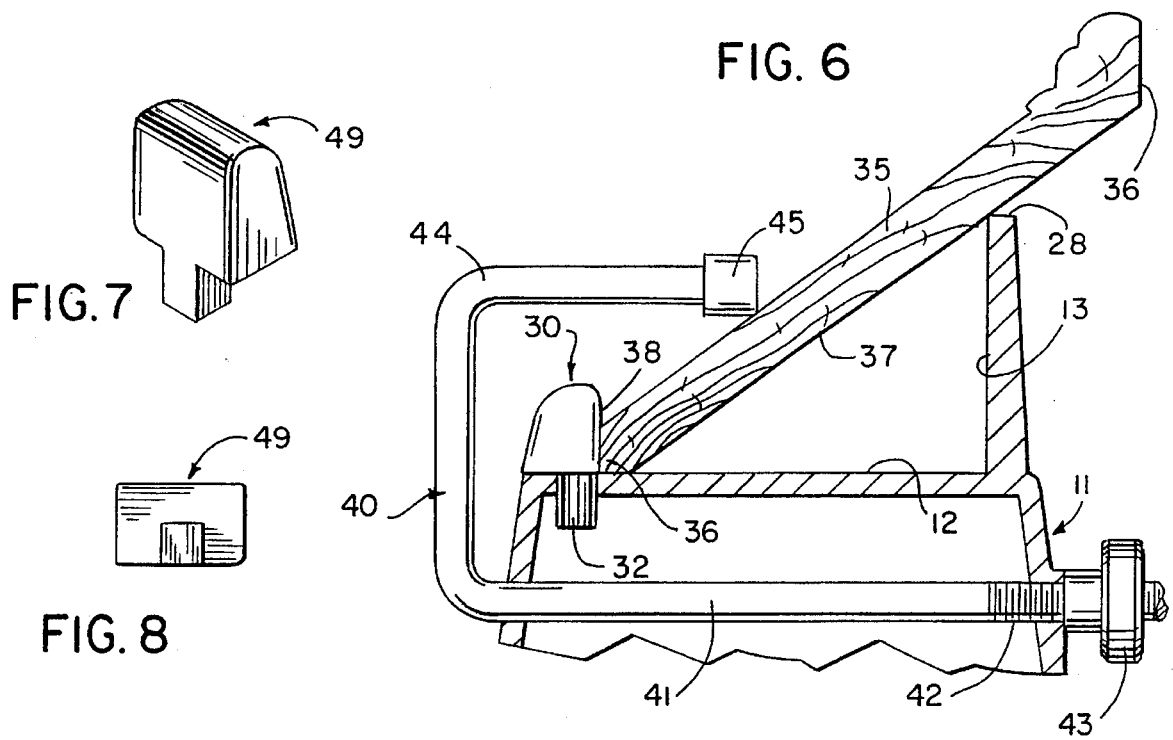
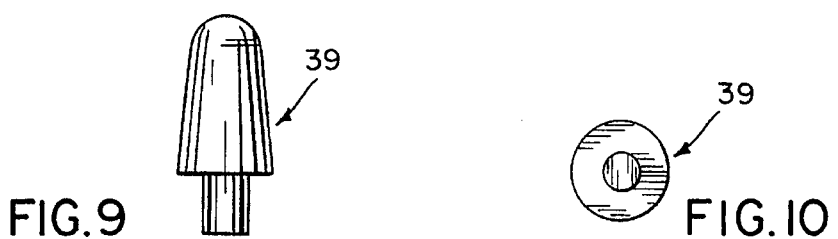
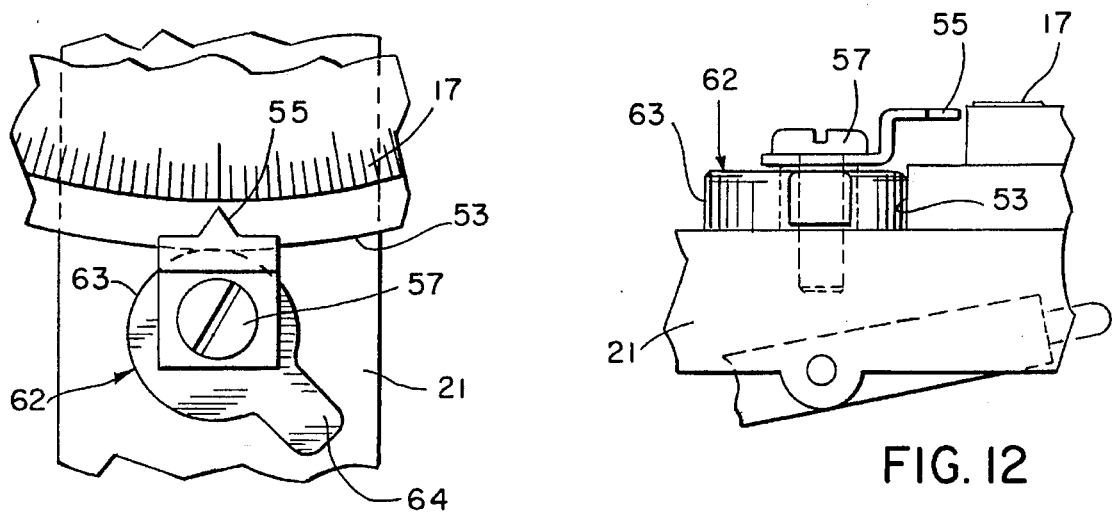

MITER BOX WITH VERTICAL AND HORIZONTAL ANGULAR POSITIONING DEVICES

BACKGROUND OF THE INVENTION

The present invention pertains to a miter box for making angled saw cuts in wooden boards and other workpieces and, more particularly, to a miter box having an improved device for holding a board in the box at an acute angle for making a compound angular cut and for locking the saw at a selected horizontal angle.

Miter boxes are well known and well developed in the prior art. The prior art discloses constructions which range from the very simple, including a true slotted box construction from which the name derives, to the very complex including sophisticated locating, alignment and clamping devices.

One problem relating to the use of a miter box which inventors have addressed for at least 100 years is the problem of properly positioning a board to be cut at an acute vertical angle from the horizontal miter box table when it is desired to make a compound angular cut. For example, when making a 45° mitered saw cut in pieces of cove molding to be joined in the corner of a room, the molding piece must be positioned in the miter box at the same angle with respect to the horizontal table and vertical backstop that the molding will assume when affixed to the wall and ceiling. If properly positioned and cut, a mitered joint in a piece of ornamentally complex cove molding is much simpler to make than a contoured cut with a coping saw.

U.S. Pat. No. 497,524 shows an early attempt at providing means for positioning a board angularly with respect to the horizontal miter box table. The device utilizes adjustable holders on both the table and the vertical backstop, making its use rather complex. U.S. Pat. No. 761,817 shows a rack and pinion mechanism to provide adjustable angled board support. U.S. Pat. No. 976,296 shows the use of angular pans within which the board rests and which can be adjusted to vary the acute vertical angle at which the board is held for cutting.

U.S. Pat. No. 3,397,722 discloses a miter box in which horizontally adjustable stops in the supporting table may be set to position a piece of cove molding or picture frame molding at the necessary vertical angular position for making a compound angled miter cut. However, the apparatus is cumbersome to adjust and the stops protrude and interrupt the flat surface of the supporting table for normal use. U.S. Pat. Nos. 4,346,636 and 4,608,898 both show complex miter sawing apparatus which, among other things, provide special holding or fixturing means to angularly position a cove molding piece for making a compound angle mitered cut.

European Patent Application No. 92850278.0 discloses a very simple arrangement for making the compound angle mitered cuts described above. In this miter box, the horizontal supporting table is provided with a number of longitudinally extending grooves into which one edge corner of the board is positioned while the underside of the board adjacent the corner rests on the upper edge of the vertical backstop. The longitudinal grooves are parallel to one another and located at selected variable distances from the backstop corresponding to varying desired acute vertical angles at which the board must be disposed for cutting. However, the longitudinal grooves are relatively shallow and may provide adequate support only for a sharp square board corner. Furthermore, the grooves will provide no means of holding the corner on the back face of a cove molding strip because of the manner in which it is formed.

The prior art also discloses a wide variety of mechanisms for establishing and locking the saw in a selected horizontal position for making a mitered cut. Some miter boxes include positive locking stops between a protractor formed in the miter box table and a saw carriage which pivots on a vertical axis with respect to the protractor to select the desired horizontal angle. The locking stops are typically located at the position of commonly used horizontal angles, such as 45°, 60°, etc. Other miter boxes utilize frictional clamping means, such as a thumb screw to lock the saw carriage in any desired horizontal angular position. These devices, however, are often cumbersome to engage and disengage. U.S. Pat. No. 446,431 shows a simple wedge device utilized to lock a miter box saw guide in a selected horizontal angular position. However, little appears to have occurred in this century to adapt simple and easy to use horizontal angle locking techniques to modern miter box constructions.

SUMMARY OF THE INVENTION

In accordance with the present invention, an apparatus for supporting a board on a conventional miter box in an acute vertical angular position with respect to the horizontal miter box table and the vertical backstop wall includes a plurality of hole pairs formed in the surface of the miter box table, each of which hole pairs lies on a line parallel to the backstop wall. A board stop having a linear abutment surface includes a pair of downwardly depending legs which are sized and spaced to be received in one of the hole pairs in a manner to position to abutment surface parallel to the lines and to the backstop wall. Each of the holes pairs is located at a predetermined distance from the backstop wall to permit the board, when positioned with one edge against the abutment surface and the undersurface adjacent the edge resting on the horizontal upper supporting edge of the backstop wall, to be located in a selected acute angular position.

Preferably, each of the hole pairs is offset with respect to the next adjacent hole pair in the direction of the lines which are defined by said pairs. The board stop preferably includes a pair of generally parallel abutment surfaces on opposite sides with the pair of legs disposed more closely adjacent one of said surfaces than the other. The horizontal table surface is preferably provided with identical sets of hole pairs on opposite sides of the centerline of the box, and a board stop is provided for each hole pair. In an alternate embodiment, individual one-legged board stops may be utilized instead of the elongate two-legged stop.

In accordance with another aspect of the invention, the miter box includes an adjustable saw guide carriage which is pivotable on a vertical axis to position the saw within a selected range of horizontal angular positions, and a horizontal angle setting device is provided which includes a horizontal arcuate protractor positioned on the miter box table and centered on the vertical axis of the guide carriage. An angle indicator is mounted on the carriage in operative association with the protractor to provide an indication of the selected horizontal angle of the carriage. The table includes an annular bearing surface which is concentric with the protractor, and a rotatable cam is mounted on a vertical axis on the carriage and has a locking surface which is movable into locking contact with the bearing surface in response to rotation of the cam to hold the carriage at the selected angle.

In the preferred embodiment, the annular bearing surface comprises a horizontal planar surface and the locking surface comprises an inclined annular ramp which is concentric with the cam axis. In another embodiment, the annular bearing surface comprises a first vertical cylindrical surface and the locking surface comprises a second vertical cylindrical surface which is mounted for eccentric rotation on the cam axis.

BRIEF DESCRIPTION OF THE DRAWINGS

FIG. 1 is an end elevation of a miter box showing the apparatus of the subject invention for supporting a board at an acute vertical angular position with respect to the horizontal table and vertical backstop.

FIG. 2 is a top plan view of the miter box shown in FIG. 1.

FIG. 3 is an enlarged sectional view taken on line 3—3 of FIG. 2 showing the adjustable board stop of the present invention.

FIG. 4 is a detail in top plan view of the preferred embodiment of the horizontal angle setting device of the present invention.

FIG. 5 is a side elevation of the detailed view of FIG. 4.

FIG. 6 is a sectional view similar to FIG. 3 showing an alternate position of the adjustable board stop.

FIGS. 7 and 8 are views of an alternate embodiment of the board stop of the present invention.

FIGS. 9 and 10 are views of another embodiment of the board stop of the present invention.

FIGS. 11 and 12 are detailed top plane and side elevation views similar to FIGS. 4 and 5, of an alternate embodiment of the horizontal angle setting device.

DETAILED DESCRIPTION OF THE PREFERRED EMBODIMENTS

Referring initially to FIGS. 1–3, a miter box 10 includes a legged stand 11 having an integral horizontal table 12 for supporting a board or other workpiece for cutting, and a backstop wall 13 extending vertically upwardly from one longitudinal edge of the table. The wall 13 is divided by a central vertical slot 14 to accommodate a saw blade 15 and allow horizontal reciprocal movement thereof, as well as vertical downward movement of the blade through the board 16 or other workpiece being cut. The foregoing construction is typical of most miter boxes in common use today.

The miter box 10 also includes a horizontally disposed arcuate angle protractor 17 located centrally on the table 12 and having its center 18 positioned in the surface of the table centered in the vertical slot 14 on a vertical line through which the saw blade 15 passes in making a cut at any horizontal angle. The miter box also includes an adjustable saw guide carriage 20 which is pivotable on a vertical axis through the center 18 to position the saw in the selected horizontal angular position. The carriage 20 includes a main horizontal pivot arm 21 and a pair of upstanding saw guide posts 19 mounted on opposite ends of the pivot arm. The guide posts 19 receive the guides 22 which retain and guide the saw blade 15. As is typical of miter boxes generally, the protractor 17 permits approximately 90° of horizontal angular movement, extending 45° in either horizontal direction from the perpendicular (90°) position for making a square cut.

In the particular construction of the miter box shown in the drawings, and with particular reference to FIG. 2, the surface of the table 12 includes a pattern of angularly disposed grooves 23 which also continue into the front face of the backstop 13 as a series of vertical grooves 24. The flat ridges 25 between the horizontal grooves 23 define the planar board supporting surface of the table and, similarly, the flat ridges 25 between the vertical grooves 24 define the flat surface for supporting the board against the backstop wall 13. The grooves. 23 and ridges 25 are, as shown, disposed at an angle of about 45° with respect to the backstop 13, but that angle is not of any particular significance.

In accordance with one aspect of the present invention, a plurality of hole pairs 26 are formed in the surface of the table 12, preferably as through holes 27 extending through the table surface. The holes are formed in complementary sets of two pairs, one pair positioned on each side of the protractor 17 and central cutting area. Each hole pair 26 lies on a line which is parallel to the backstop wall 13 and each set of complementary hole pairs is colinear. Also, the upper edge of the wall 13 is horizontal and parallel to the lines defined by each hole pair 26 and each complementary set of two hole pairs.

A demountable and repositionable board stop 30 is provided for a hole pair on each side of the table 12. Thus, two identical board stops 30 are typically utilized, each of which cooperates with one hole pair 26 of a complementary set. However, the miter box utilizing this aspect of the invention could function adequately with the use of a single board stop 30.

Each board stop 30 includes a linear abutment surface 31 and a pair of downwardly depending legs 32 which are sized and spaced to fit in any one of the hole pairs 26 in a manner which positions the abutment surface 31 parallel to the horizontal line defined by the hole pair as well as the horizontal line defined by the upper edge 28 of the backstop wall 13. As may best be seen in FIGS. 1 and 3, the board 16 may be positioned in the miter box with one narrow edge 33 in engagement with the abutment surface 31 and the undersurface 34 resting on the upper edge 28 of the backstop wall 13. With the board 16 in this position, if the horizontal angular position of the carriage 20 and saw 15 are positioned on either side of the centered 90° square cut position, the saw will make a cut having a compound angle with the surface of the cut not being perpendicular to any surface of the board. Such cuts are useful, for example, when making a mitered cut for a right angle butt joint in two pieces of cove molding to be joined in the corner of a room, as will be described in greater detail below. Each of the hole pairs 26 is located at a selected horizontal distance from the backstop wall 13 so that a board 16 positioned as described above may be selectively set at a specific acute vertical angle with respect to the horizontal table 13 (or its complement angle with respect to the vertical back wall 13).

Also shown in phantom in FIG. 1 and in full section in FIG. 6 is the cross section of a conventional piece of cove molding 35. As is typical with cove molding, the opposite ends are provided with narrow linear contact surfaces 36 disposed in mutually perpendicular planes, which surfaces engage the wall and ceiling along which the molding is mounted, leaving the characteristic open space behind the molding of triangular cross section. However, as may be seen by comparing the rectangular cross section board 16 and the irregular cross section cove molding 35 in FIG. 1, the undersurface 37 of the latter is disposed at a slightly greater acute angle with respect to the horizontal than the undersurface 34 of the board 16. This, of course, is because the cove molding 35 does not have the same square lower corner as the board 16, but rather rests with the lower contact surface 36 flush with the table 12. As a result, there will be a slight discrepancy between the compound angles cut in the two pieces when the board stops 30 are located in the same hole pairs 26. To compensate for this angular discrepancy, the board stop 30 may be provided with a supplemental abutment surface 38 on the side opposite the abutment surface 31. In addition, the legs 32 are positioned nearer the supplemental abutment surface 38 and, when the board stop is reversed and replaced in the same hole pair, the supplemental abutment surface 38 will be positioned farther from the backstop wall than was the abutment surface 31 in the original position. This increased distance will result in a vertical angle of repose of the cove molding 35 (as shown in FIG. 6) which is smaller than the angle shown in phantom and discussed above and, if the thickness of the board stop 30 defining the distance between the two surfaces 31 and 38 is properly selected, the actual vertical acute angle of repose of the board 16 and cove molding 35 may be made identical when the stop is appropriately reversed.

As shown in FIG. 2, in order to avoid crowding and possible breakout in the formation of the through holes 27, each hole pair 26 is offset with respect to the next adjacent hole pair in the longitudinal direction of the miter box (the direction of the lines formed by said hole pairs). The hole pair patterns may be staggered, as shown, or arranged in any convenient pattern which provides sufficient separation. Also, as shown, the holes are preferably formed in the surfaces of the horizontal grooves 23 and are thus recessed slightly from the horizontal supporting surface of the table 12 as defined by the flat surfaces of the ridges 25.

In lieu of a two-legged board stop 30, a pair of identical one-legged stops 39 (FIGS. 9 and 10) or 49 (FIGS. 7 and 8) could be used. The two one-legged stops 39 could be placed in any pair of holes 27 comprising one of the complementary sets of two hole pairs 26. The stops 39 are symmetrical in top plan and do not provide alternate abutment surfaces. However, stop 49 has an offset leg which will result in opposite abutment surfaces being located at different distances from the backstop when the stop 49 is reversed. Preferably, the leg of stop 49 is square and the miter box table 12 would include complementary square holes to prevent rotation of the stops 49.

To help hold the board or molding in its selected vertical angular position, the miter box 10 is provided with a pair of locking bars 40 each having the shape of a horizontally disposed J. The long leg 41 of the locking bar is mounted for sliding movement in a pair of aligned holes in the front and back of the stand 11. The free end of the long leg 41 is provided with an extended screw thread 42. A thumb nut 43 threaded onto the leg end may be turned to cause horizontal movement of the locking bar. The short leg 44 of the locking bar has a rubber pad 45 attached to its free end and adjustable horizontal movement of the bar by turning the nut 43 will bring the pad into holding contact with the board, molding or other workpiece set in the miter box. Both locking bars 40, of course, are typically utilized and operate identically.

Referring to FIG. 1 and also to FIGS. 4–5, the saw positioning carriage 20 may include a manually operable carriage lock 46 of conventional construction, including an operating lever 47 which is lifted vertically against the bias of a bias spring 48 to cause a locking peg 50 to move vertically downwardly out of a corresponding locking hole in the underside of the surface of the protractor 17. The locking holes are typically provided at only selected incremental angles which are commonly used, such as 45°, 60° and other 5° and/or 10° increments. However, when it is desired to make a cut at a horizontal angle between a pair of incremental locking hole locations, it is desirable to have some means to set and lock the carriage in that intermediate position which is simple to operate, both to lock and to unlock that selected angular position. The protractor 17 includes an outer peripheral shoulder 51 which defines a planar annular horizontally disposed surface 52 and an annular cylindrical vertically disposed surface 53. An angle indicator 54 is mounted on the carriage 20 just radially outwardly of the shoulder 51 and includes a pointer 55 to accurately show the selected horizontal angle at which the carriage is disposed, in a manner well known in the art. In the embodiment shown in FIGS. 4 and 5, a rotatable locking cam 56 is mounted beneath the angle indicator 54 and rotates about the axis of the mounting screw 57 by which the indicator/locking cam assembly is secured to the carriage. The locking cam 56 has a cylindrical central hub 58 and an integral circular upper flange 60 having a diameter large enough to overlie the annular planar surface 52 on the edge of the protractor 17. The underside of the flange 60 is formed with an inclined annular ramp 59 which is concentric with the cam axis so that, when the cam is rotated by grasping the short handle 61, the inclined annular ramp bears on the annular surface 52 with increasing frictional force to lock and hold the carriage 20 in its selected angular position.

Referring also to FIGS. 11 and 12, an alternate locking cam 62 has a vertically disposed cylindrical locking surface 63 which is mounted for eccentric rotation on the axis of the mounting screw 57 so that manual rotation of the cam 62 by the handle 64 causes the eccentric locking surface 63 to bear with increasing force against the vertical annular surface 53 on the outer periphery of the protractor shoulder 51 until sufficient frictional force is developed to lock and hold the carriage in its selected position.

Various modes of carrying out the present invention are contemplated as being within the scope of the following claims particularly pointing out and distinctly claiming the subject matter which is regarded as the invention.

I claim:

1. A miter box having a horizontal table for supporting a workpiece to be cut, a vertical back wall to provide an abutment for the workpiece, an adjustable saw guide carriage having means to operatively support a saw, said saw guide carriage being pivotably mounted to the horizontal table so as to be pivotable about a first vertical axis to position the saw within a range of horizontal angular positions, and a horizontal angle setting device for locking the carriage in a selected one of said horizontal angular positions, said device comprising:

a horizontally disposed arcuate protractor disposed on the miter box table and centered on the first vertical axis;

an angle indicator mounted on the carriage in operative association with said protractor to provide an indication of the selected horizontal angular position of the carriage;

an annular bearing surface on the table concentric with said protractor, said bearing surface being a horizontal and planar surface; and, a rotatable cam rotatably mounted on the carriage for rotation about a second vertical axis, wherein said rotatable cam has a locking surface movable into locking contact with said bearing surface in response to rotation of said cam to hold the carriage at the selected horizontal angular position, said locking surface comprising an inclined annular ramp concentric with said second vertical axis.

\* \* \* \* \*